United States Patent [19]
Stiller

[11] Patent Number: 5,482,027
[45] Date of Patent: Jan. 9, 1996

[54] PARTITIONED BISECTOR REGENERATIVE AIR HEATER

[75] Inventor: Mark H. Stiller, Manchester, Mo.

[73] Assignee: Combustion Engineering, Inc., Windsor, Conn.

[21] Appl. No.: 288,843

[22] Filed: Aug. 11, 1994

[51] Int. Cl.⁶ .................................................. F24H 3/00
[52] U.S. Cl. .................................. 126/99 R; 126/110 K; 126/101; 126/117; 110/267; 110/347; 110/106
[58] Field of Search ................................. 126/99 R, 101, 126/110 R, 117; 165/7; 110/267, 347, 106

[56] References Cited

U.S. PATENT DOCUMENTS

| | | | |
|---|---|---|---|
| 3,774,374 | 11/1973 | Dufour et al. | 126/99 R |
| 4,442,783 | 4/1984 | Pajonos et al. | 110/106 X |
| 4,967,726 | 11/1990 | Finch | 126/99 R |
| 4,995,808 | 2/1991 | Pink et al. | 126/99 R X |
| 5,005,556 | 4/1991 | Astle, Jr. | 126/110 R |

*Primary Examiner*—Larry Jones
*Attorney, Agent, or Firm*—Robert S. Smith

[57] ABSTRACT

A furnace apparatus which includes a plurality of water walls. Each includes a plurality of tubes and the water walls collectively enclose a combustion chamber. The apparatus includes a plurality of windboxes, each of the windboxes is disposed intermediate adjacent water walls. A pulverizer and ducting to direct the flow of pulverized coal to the windboxes is also a part of the apparatus in accordance with the invention as is a bisector regenerative air heater having a rotor a housing having a generally cylindrical cavity in which a drum shaped rotor having heat transfer surfaces thereon is mounted for rotation on a shaft. The heater includes ducting for directing flue gas and forced draft air respectively into first and second angular sectors of the cavity which at any one instant will flow over respective angular sectors of the rotor. The rotor is heated during the travel of any portion thereof in the first angular sector and is cooled in the second angular sector. The apparatus also includes an elongated duct for conducting all of the forced draft air out of the heater and first apparatus for ducting. The first apparatus for ducting directs only the forced draft air flowing over a portion of the rotor immedeately after passage of each portion thereof from the first angular sector into the second angular sector; and second apparatus for ducting, the second apparatus for ducting directing the forced draft air from the first apparatus for ducting to the pulverizer.

20 Claims, 4 Drawing Sheets

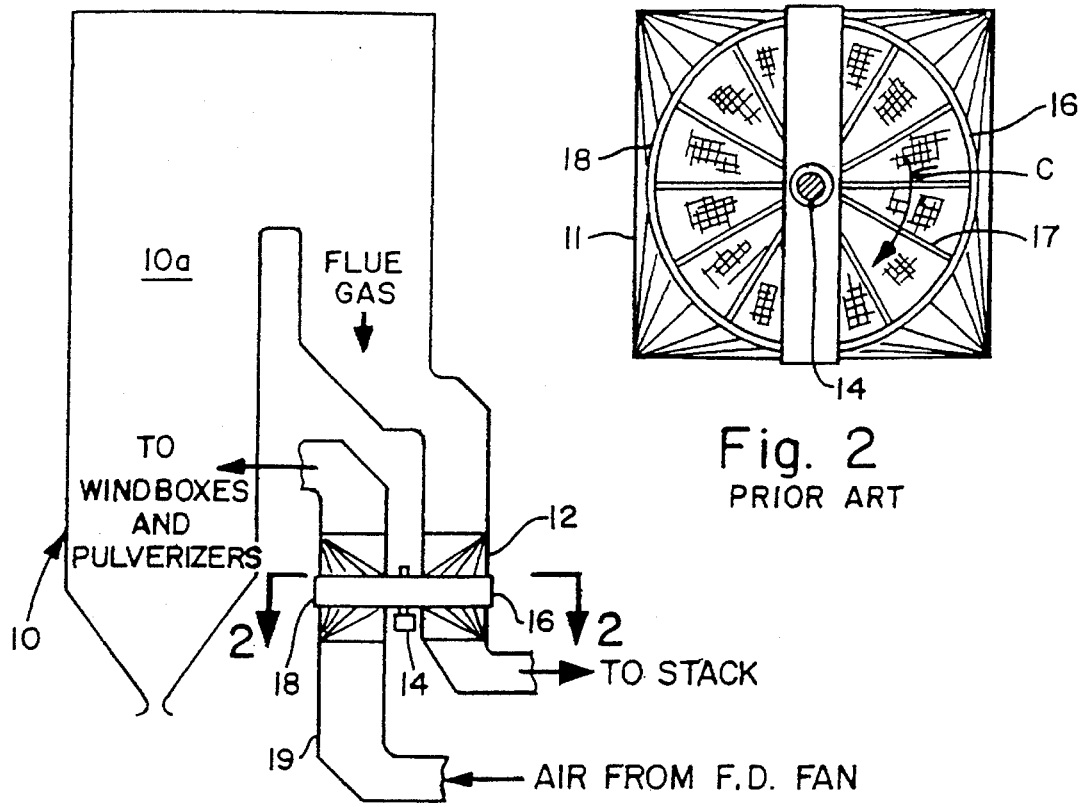
Fig. 2
PRIOR ART
Fig. 1
PRIOR ART
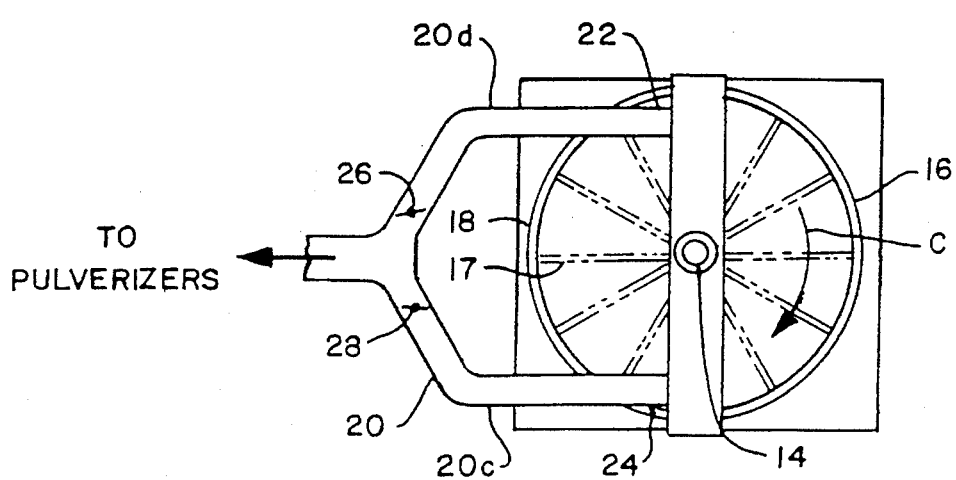
Fig. 3

PARTITIONED BISECTOR REGENERATIVE AIR HEATER

BACKGROUND OF THE INVENTION

The invention relates to air heaters of the type that are used in steam generation apparatus and more particularly to apparatus for partitioning the discharge of a bisector air heater into two or more zones.

Air heaters (also known as preheaters) are used in steam generation apparatus where they have two important functions. They cool the gases exiting from the generation apparatus before the gases pass to the atmosphere. Simultaneously, air heaters raise the temperature of the incoming air that is used in the combustion process within the steam generation apparatus. This has the effect of increasing fuel firing efficiency. Air heaters are necessary for pulverized coal firing to provide (a) drying of the coal and (b) a transporting medium. The present invention has particular application to rotary regenerative air heaters. This type of air heater transfers heat to a large drum-shaped rotor that turns continuously through the flue gas and incoming air (forced draft) air streams.

In a typical heater of this type, there is a vertical shaft on which the rotor turns. The heater typically is provided with shrouds to direct air flows in two axially extending cylindrical sections. In the bisector air preheater, the sectors are defined by a single vertical plane extending through the vertical shaft on which the rotor turns. Typically, the flue gases are directed downwardly in one cylindrical section and the incoming ambient (forced draft) air is directed through the other cylindrical section.

A typical rotor for such air preheaters has either 12 or 24 heat absorbing radial members attached to a vertical shaft. The rotor sealing system includes leaf type labyrinth seals that are used with axial sealing plates. This system effectively separates the incoming ambient air (forced draft) air stream from the flue gas stream. Both the radial and axial sealing plates may be adjusted during operation for maximum effectiveness.

Other heater constructions may accommodate horizontal flow. The vertical shaft air preheater can be arranged for flue gas flow upward or downward, while the horizontal air preheater can be arranged for gas-over-air or air-over-gas at the option of the plant designer. An electric motor drives the rotor through a speed reducer pinion gear which engages a pin rack attached to the periphery of the rotor. Such regenerative air heaters are typically designed with rotor diameters of between 7 feet and 65 feet.

A design compromise in conventional regenerative bisector air heaters in coal fired steam generation apparatus is that same temperature air is supplied to both the combustion cavity and the pulverizer(s) for the coal. In practice, the requirements for the pulverizer(s) and the combustion process are not the same. The prior art required a compromise between the competing requirements.

Conventionally, the air supplied to the pulverizer(s) is taken from the forced draft air duct well downstream of the air heater. Because the air is extracted from the duct at a point removed the air heater, the air is at substantially a uniform temperature. The utilization of the forced draft air taken downstream of the air heater is satisfactory for some applications. However, the lack of control of the temperature of the air supplied to the pulverizer is not satisfactory for many applications.

It is an object of the present invention to provide apparatus which will allow control of the air temperature flowing to the pulverizers.

It is another object of the invention to provide a structure that will allow the control of the temperature of the air supplied to the pulverizers.

Another object of the invention is to provide apparatus which will be relatively simple in construction.

SUMMARY OF THE INVENTION

It has now been found that these and other objects of the invention may be attained in a furnace apparatus which includes a plurality of water walls. Each includes a plurality of tubes and the water walls collectively enclose a combustion chamber. The apparatus includes a plurality of windboxes, each of the windboxes is disposed intermediate adjacent water walls. A pulverizer and ducting to direct the flow of pulverized coal to the windboxes is also a part of the apparatus in accordance with the invention as is a bisector regenerative air heater having a rotor housing having a generally cylindrical cavity in which a drum shaped rotor having heat transfer surfaces thereon is mounted for rotation on a shaft. The heater includes ducting for directing flue gas and forced draft air respectively into first and second angular sectors of the cavity which at any one instant will flow over respective angular sectors of the rotor. The rotor is heated during the travel of any portion thereof in the first angular sector and is cooled in the second angular sector. The apparatus also includes an elongated duct for conducting all of the forced draft air out of the heater, first means for ducting, the first means for ducting directing only the forced draft air flowing over a portion of the rotor immediately after passage of each portion thereof from the first angular sector into the second angular sector; and second means for ducting, the second means for ducting directing the forced draft air from the first means for ducting to the pulverizer.

In some forms of the invention the first means for ducting includes a partition in the duct to separate flow through the duct into major and minor parts. The partition may be generally aligned with the axis of the duct and the partition may be disposed in spaced relation with respect to a face of the preheater.

In other forms of the invention the second means for ducting comprises a generally Y-shaped duct having first and second legs and the first leg is coupled to the first means for ducting. The second leg may be coupled to the duct in a manner to receive only a part of the flow through the duct that is not a part of the flow through the first means for ducting.

The duct may further include a third means for ducting and that means for ducting directs only the forced draft air flowing over a portion of the rotor just before passage of each portion thereof from the second angular sector into the first angular sector. The third means for ducting in such embodiment is coupled to the second leg. The third means for ducting may comprises a second partition which may be generally aligned with the axis of the duct. The second partition is disposed in spaced relation with respect to a face of the heater in some forms of the invention.

BRIEF DESCRIPTION OF THE DRAWINGS:

The invention will be better understood by reference to the accompanying drawings in which:

FIG. 1 is a partially schematic side elevational view of a furnace incorporating a bisector regenerative air heater of conventional design.

FIG. 2 is a sectional view taken along the Line 2—2 of FIG. 1.

FIG. 3 is a view similar to FIG. 2 illustrating the ducting in accordance with the present invention that allows selective direction of forced draft air from the coolest part of the air preheater and the warmest part of the air preheater to control the temperature of the air being directed to the pulverizer(s).

DESCRIPTION OF THE PREFERRED EMBODIMENT:

Coal fired furnaces are typically provided with a plurality of ducts or pipes to direct pulverized coal that is burned in the furnace. The pulverized coal and primary air is typically directed to a plurality of fuel-air admission assemblies arrayed in respective vertically extending wind boxes. The wind boxes are disposed in one or more walls of the furnace.

One method of firing coal in conventional coal fired steam generator boilers is tangential firing. In this method, pulverized coal enters the furnace in a primary air stream through the fuel air admission assemblies. Each wind box comprises a vertical array of alternate secondary air compartments and fuel-air admission assemblies. The fuel air stream discharged from these fuel air admission assemblies is directed tangentially to an imaginary circle in the middle of the furnace. This creates a fireball that serves as a continuous source of ignition for the incoming coal. More specifically, a flame is established at one corner which in turns supplies ignition energy to stabilize the flame emanating from a corner downstream of and laterally adjacent.

Figure 8:
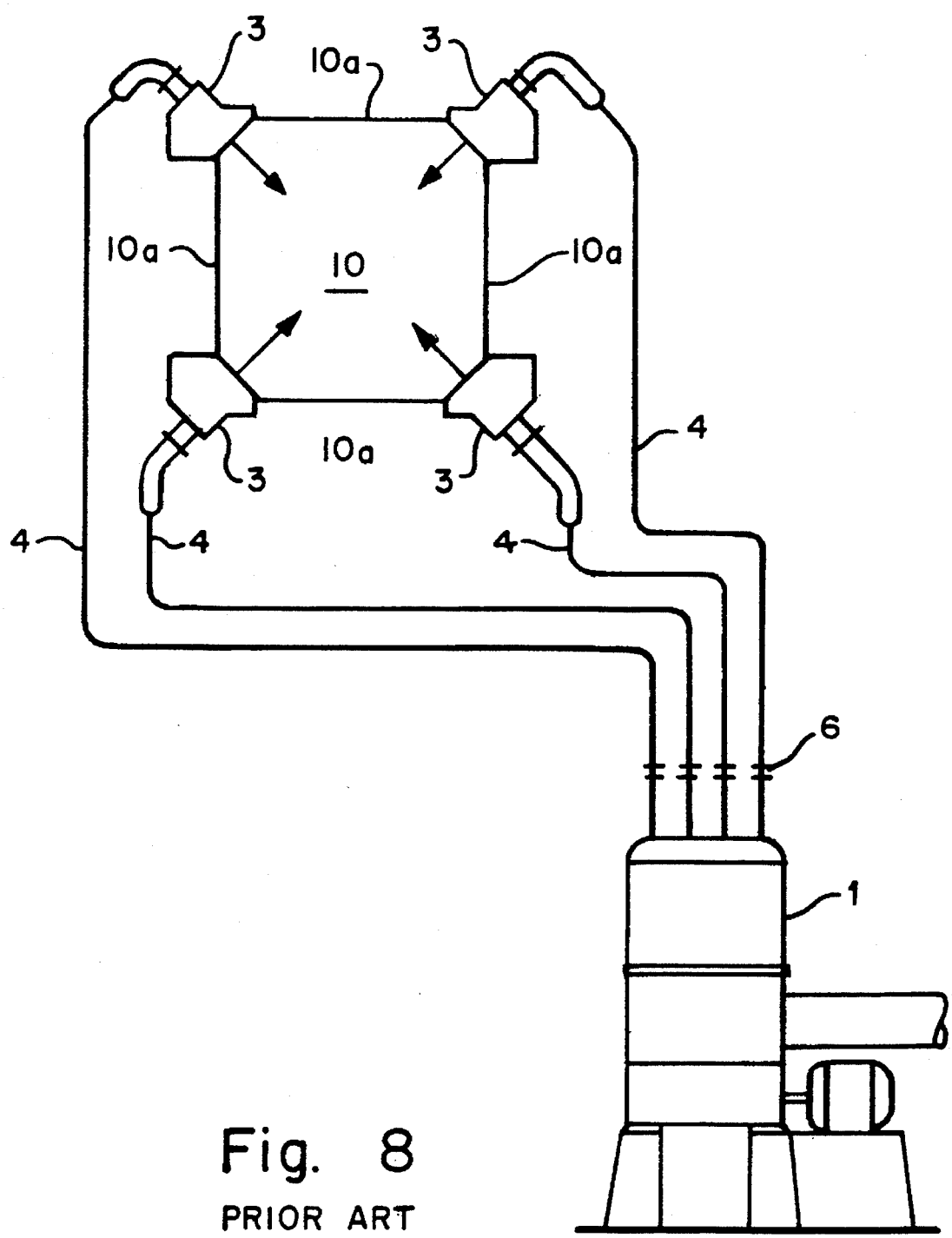
FIG. 8 is a prior art apparatus in which the present invention may be employed.

Referring now to FIGS. 8 there is shown prior art apparatus in which the present invention may be employed. The apparatus includes a coal pulverizer 1 that supplies pulverized coal to a furnace 10. The pulverized coal from the pulverizer 1 is ducted to the furnace 2 by means of respective ducts 4, 4, 4, 4. Those skilled in the art will recognize that more than one pulverizer 1 may be utilized without departing from the spirit of the invention. Each duct 4 is provided with an orifice 6 to balance flow.

Referring now to FIGS. 1 and 2, there is shown a conventional prior art furnace 10 and air preheater or heater 11 assembly. The furnace includes four waterwalls 10a. In the illustrated embodiment, the air heater 11 includes a housing having a generally cylindrical cavity in which a drum shaped rotor 12 is mounted for rotation on a vertical shaft 14. Thus, the cavity and the rotor 12 have angular sectors. The ducting to the heater 11, illustrated schematically in FIG. 4, divides the flow of flue gas and forced draft air into first and second angular sectors of the cavity which at any one instant will flow over specific angular sectors of the rotor 12.

It will be understood that as the drum shaped rotor 12 rotates it will pass through the respective angular sectors of the cavity. For convenience in describing the structure, reference will be made to angular sectors 16, 18 of the drum shaped rotor. Those skilled in the art will understand that those designations refer to the physical parts of the rotor 12 that are at a given instant of time are in first and second sectors of the cavity of the heater 11. In subsequent time intervals or instants the rotor 12 will have different angular sectors aligned with the same first and second angular sectors of the cavity of the heater 11.

Thus, at a given instant, flue gases are directed through an angular sector 16. This angular sector is about 180 degrees, as is the angular sector 18 through which forced draft (ambient air) is directed by a fan (not shown). The forced draft air from the angular sector 18 is thence directed in the conventional manner to the various windboxes and pulverizers in a coal fired furnace. In the conventional apparatus, the forced draft air flow for the pulverizers is split off a substantial distance from the heater 11 to ensure uniformity of the temperature of the air reaching the pulverizers.

As described in the Background of the Invention section, the conventional approach does not allow control of the temperature of the forced draft air, which is directed to the pulverizers. This disadvantage of the prior art structure is overcome in the present invention by providing a generally Y-shaped duct 20. The "Y" is most evident in the plan view of FIG. 3 which illustrates the axial extremities 22, 24 of the Y-shaped duct 20. (Although the description herein will refer to a Y-shaped duct it will be understood that the duct may be U-shaped or some other shape as long as there are first and second inlets for air at respective first and second different temperatures and one outlet for the mixture of forced draft air from the first and second inlets.)

The rotor of the preheater 11 rotates clockwise as indicated by respective arcuate arrows C in both FIGS. 2 and 3. Because the entire quadrant or angular sector 16 of the rotor 12 is exposed to the hot flue gases, the portion of the quadrant or angular sector 18 of the rotor 12 proximate the axial extremity 24 of the duct 20g in FIG. 7 will be hottest because the radial extending members heat transfer members 17 in this area have been exposed to the cooling effect of the incoming forced draft air for a shorter period of time than any other portion of the drum 12 that is then exposed to forced draft air.

Accordingly, the forced draft air flowing over the rotor 12 proximate to the axial extremity 24 will have a higher temperature than the forced draft air flowing over any other part of the rotor. Conversely, the forced draft air is flowing over the rotor proximate to the axial extremity 22 is flowing over the coldest part of the rotor 12 that has forced draft air flowing over it. Thus, forced draft air picked up by the axial extremity 22 of the Y-shaped duct 20 will be much colder than the forced draft air picked up by the axial extremity 24. Stated another way, the radial extending members heat transfer members 17 will have been cooled through approximately 180 degrees of travel of the rotor 12. Hence, the forced draft air passing over the rotor proximate the axial extremity 22 will be heated much less by the radially extending members 17 that are proximate to the axial extremity 22.

Figure 7:
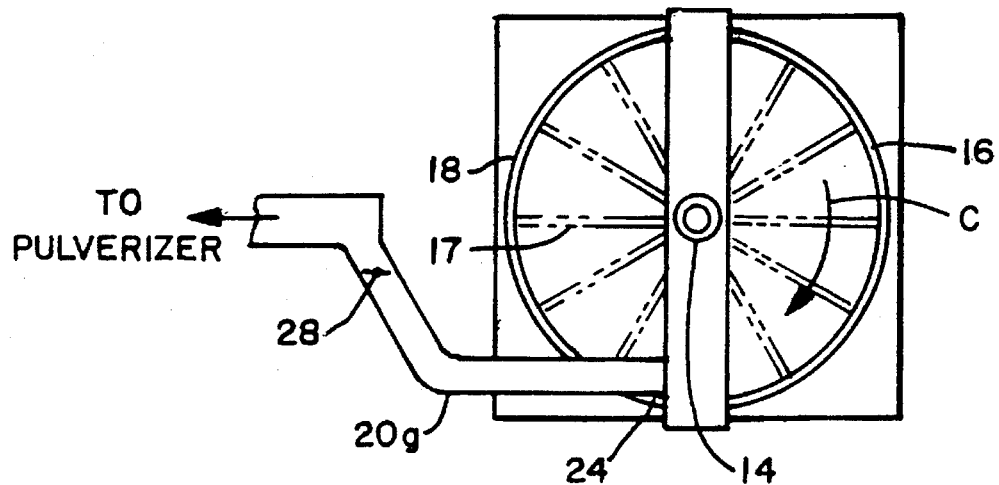
FIG. 7 is a view similar to FIG. 3 illustrating the ducting in accordance with the present invention in an embodiment that supplies all air to the pulverizer(s) from the hottest part of the outlet for forced draft air leaving the air preheater.

The first embodiment or form of the invention, the most simple form of the invention, is shown in FIG. 7. In this form of the invention only the hottest possible air is supplied to the pulverizers. A duct 20g has an axial extremity 24 that receives this hottest possible forced draft air and only that air is supplied to the pulverizers.

Figure 4:
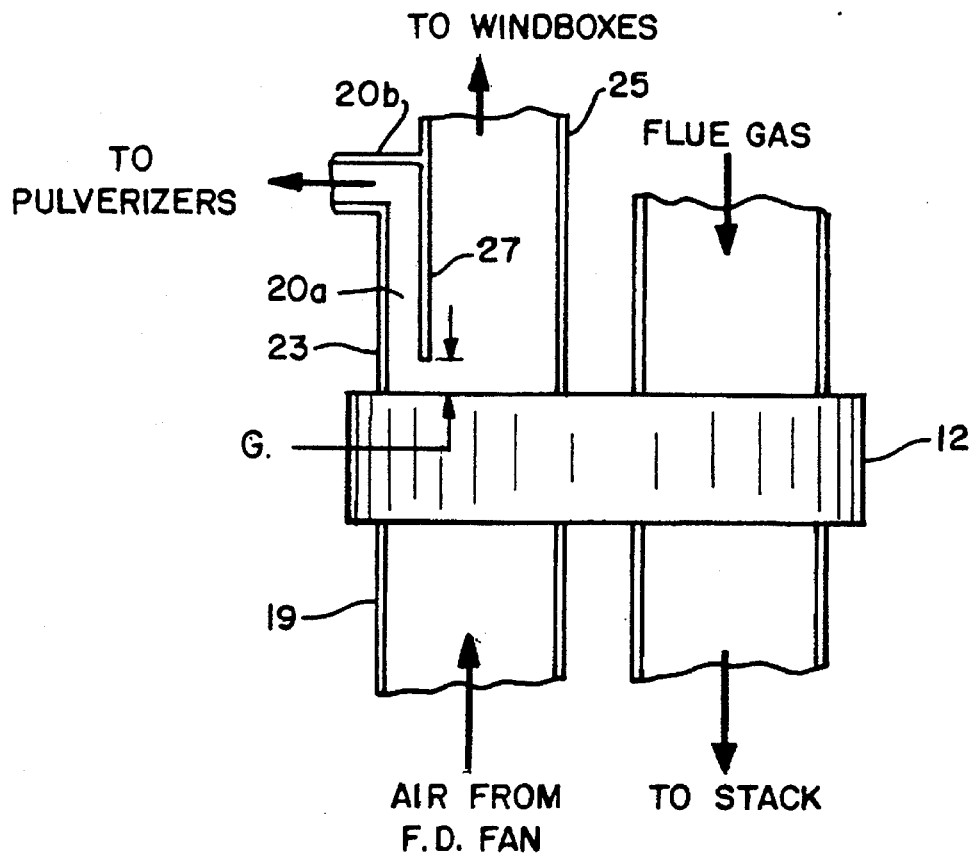
FIG. 4 is a partially schematic elevational view illustrating a single partition embodiment of the invention and more particularly showing the relationship between the ducts illustrated in FIG. 3 and the air preheater.
Figure 5:
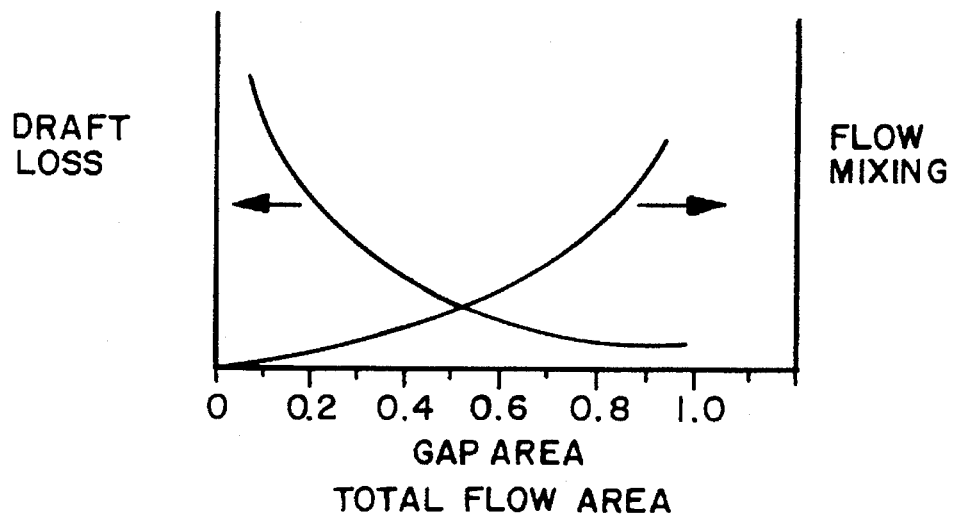
FIG. 5 is a diagrammatic view illustrating the design trade-offs inherent in the dimensioning of the take-offs for the air for the pulverizer(s).

Referring now specifically to FIGS. 4 and 5, there is shown an elevational schematic representation of the ducting to and from the preheater 11 and a diagrammatic view illustrating the design considerations relating to the forced draft air outlet of the heater 11. As described above, the rotor 12 includes a generally cylindrical section which at any one instant will have flue gases flowing through it to add heat to half of the radial extending members heat transfer members 17. Aligned with another generally cylindrical section of the rotor 12 is an inlet 19 for forced draft air from a forced draft fan (not shown). Thus, the other half of the radial extending members heat transfer members 17 are in a quadrant where they will be cooled by the relatively cool forced draft air.

The outlet of the forced draft air from the air heater 11 is a partitioned duct 23. Typically, the partitioned duct 23 comprises the flow channel 20a and a primary flow channel 25. The flow from the channel or duct 25 is directed to the windboxes (not shown). The flow from the duct 20a is directed to the pulverizers. The duct or partition flow channel 20a is defined by a partition 27. In one form of the invention, the partition 27 defining the flow channel 20a is crescent shaped. Often the duct 23 will have a circular cross-section. It will be understood that ordinarily the cross-sectional areas of the respective flow channels are much more important than the precise geometric shape of the cross-section of the respective channels.

The partition 27 is spaced from the base of the air preheater 11, such that there is a gap G therebetween. The dimensioning of the gap is of particular importance. The partition 27 must separate the mass flow and temperature of the air to the pulverizers from the mass flow and temperature of the air to the windbox. The sizing of the gap requires a design trade-off because of conflicting requirements. On the one hand the gap G must be large enough to allow cross flow between the pulverizer air duct 20 and the primary flow channel (earlier cite, here you say main duct) 25.

More specifically, the gap G cross-sectional area must be large enough so that the draft loss or pressure drop inherent in the cross-flow is not excessive. A large pressure drop would require the use of a larger forced draft fan, and this is obviously not desirable. On the other hand, the gap G must be small enough to prevent excessive mixing of the respective flows in which case the function of the partition will be defeated. As described above, the partition 27 defines the flow channel 20a in the duct 23 that extends from the preheater 11. The flow channel 20a is in fluid communication with an elbow 20b which couples the flow channel 20a to the duct 20g in the most simple form of the invention.

In a second embodiment or form of the invention, the duct 20g shown in FIG. 7 is replaced with a Y-shaped duct such as that shown in FIG. 3. In this embodiment the leg 20c is analogous to the leg 20g in the most simple embodiment of the invention. In addition, the Y-shaped duct includes a leg 20d. The duct 20d has a damper 26 disposed therein and has an axial extremity 22. In this embodiment of the invention the structure shown in FIG. 4 connects with the axial extremities 22, 23 of the Y-shaped duct.

More specifically, the axial extremity 24 is coupled to the flow channel 20a shown in FIG. 4 and the axial extremity 22 receives some of the same forced draft air that goes to the windboxes through the primary flow channel 25.

Figure 6:
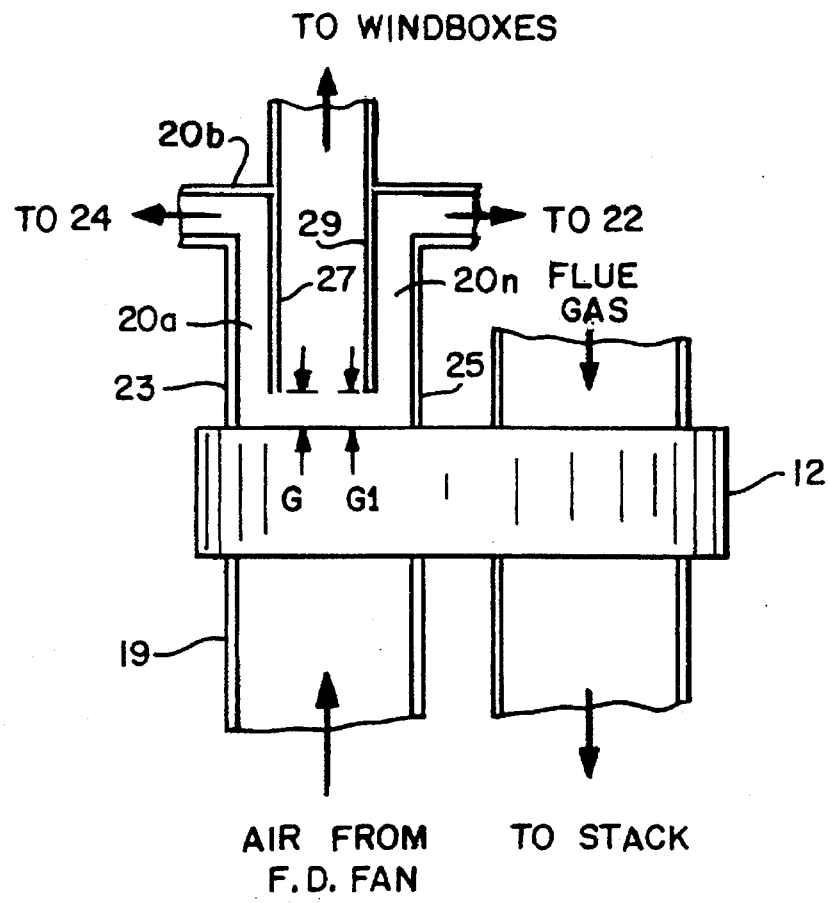
FIG. 6 is a partially schematic elevational view, similar to FIG. 4 illustrating a double partition embodiment of the invention and more particularly showing the relationship between the ducts illustrated in FIG. 3 and the air preheater.

In a third embodiment or form of the invention the Y-shaped duct 20 shown in FIG. 3 is coupled to the structure show in FIG. 6. In the structure shown in FIG. 6 there are provided two partitions 27, 29 that define respective flow channels 20a and 20n. These channel are respectively coupled to axial extremities 24, 22 as indicated in FIG. 6. The partition 29 may be a cylindrical section. It will be understood that the partition 29 will divert a portion of the flow passing through the forced draft side of the preheater 11 into discrete ducts 20d. The partition 29 is provided to segment or partition part of the flow forced draft air from the preheater 11 into the duct 20d. The location of the partition 29 will determine the temperature of air diverted from the entire forced draft flow. The dampers 26, 28 in the Y-shaped duct permit mixing of air between the ducts 20c and 20d. More specifically, the valves or dampers 26, 28 may be modulated to control the relative quantities of relatively hot air and relatively cold air that is directed to the pulverizers.

The partition 29 is disposed with a gap G1 that ordinarily is the same as the gap G. Ordinarily the flow in the flow channel 20n will be less than 30% of the total forced draft air flow out of the heater 11.

The connections to the axial extremities 22, 24 will vary with the specific application. For example, for some applications the temperature of the forced draft air supplied to the pulverizers will always be substantially above the "average" temperature of the forced draft air exiting the heater 11. Thus, the first embodiment is the most suitable for such applications.

Particularly in the second and third forms of the invention there are disposed in the Y-shaped duct 20 respective dampers or valves 26, 28 that respectively modulate flow of the forced draft air (a) passing through the rotor and (b) the axial extremities 22, 24 of the Y-shaped duct 20. It will be seen that by modulating the valves 26, 28, the temperature of the forced draft air passing to the pulverizers may be controlled. This is advantageous because the air supplied to the pulverizers must be hot enough to dry the coal in the pulverizer without the need for tempering air being added to the pulverizers. Those skilled in the art will recognize that tempering air will reduce the efficiency of the furnace.

It will thus be seen that much greater control of the temperature of the air reaching the pulverizers is achieved and that this ensures ample drying of the coal without the need for tempering air that would lower the efficiency of the furnace. Ordinarily, the cross-sectional area of the partitioned flow channel 20a or 20n should be between 3% and 30% of the cross-sectional area of the forced draft air outlet of the air preheater 11.

It is of major importance in an apparatus in accordance with the present invention to provide the correct sizing of the cross-sectional area of the partitioned flow channel 20a relative to the cross-sectional area of the entire forced draft air flow through the preheater 11. In addition, the spacing or gap "G" or "G1", the clearance between the partition 27 and the face of the preheater 11, is also of major importance. The gap G is necessary to allow lateral flow of the force draft air exiting the preheater 11. In other words, during various operating modes, it will be necessary for air passing out of the forced draft side of the preheater 11 to flow sideways rather than axially into the channels shown in FIGS. 4 and 6. The gaps "G" and "G1" must be large enough to allow this cross flow between (a) the respective partitioned air flow duct 20a, 20n and (b) the primary air duct 25. The pressure drop or draft loss caused by this cross-flow must not be excessive because that would mean that a larger forced draft fan would be required. This would result in additional cost for the fan and additional operating costs. Conversely, the gap G must be small enough to prevent excessive mixing which would defeat the purpose of the separating relatively hot or relatively cold air from the primary forced draft flow.

The apparatus in accordance with the invention requires a method of operation that is different from conventional trisector air heater technology. In the present apparatus the pressure within the rotation flow channel 20a must be maintained at a level that will promote required flow to the pulverizers. If the flow requirement of the pulverizers should decrease the pressure in the primary flow partition 25 is increased and the surplus air flows through the gap G. It will thus be seen that the gaps G, G1 eliminate the need for mechanical seals common to trisector air heaters. Preferably the air heater rotation speed will be varied to increase or decrease as the need for higher or lower air temperatures for the pulverizers changes.

For most applications the provision of two partitioned flow channels 20a, 20n for respectively relatively hot air and relatively cold air is sufficient. However, it is within the present invention to provide additional partitioned flow channels to provide additional control possibilities. It will be further understood that the temperature of the air supplied to the pulverizers may be further modified by using tempering air in accordance with conventional techniques. Most specifically, the pulverizers operate with a vacuum in the interior thereof. By opening passageways to ambient the air temperature within the pulverizers may be tempered by the ambient air. The air admitted to the pulverizers in this manner is referred to as tempering air.

It will be further understood that with the Y-shaped duct 20 as shown in the preferred embodiment the conventional tempering air system may not be necessary in the higher operating load ranges of the boiler. By avoiding the use of tempering air, the boiler unit efficiency will increase. Stated another way, the addition of tempering air reduces the efficiency of the apparatus and thus it is advantageous to avoid the use of the tempering air. The invention has been described with reference to its illustrated preferred embodiment. Persons skilled in the art of such devices may upon disclosure to the teachings herein, conceive other variations. Such variations are deemed to be encompassed by the disclosure, the invention being delimited only by the following claims.

Having thus described my invention I claim:

1. A furnace apparatus which comprises:

a plurality of water walls each including a plurality of tubes, said water walls collectively enclosing a combustion chamber;

a plurality of windboxes, each of said windboxes being disposed intermediate adjacent water walls;

a pulverizer and ducting to direct the flow of pulverized coal to said windboxes;

a bisector regenerative air heater having a drum shaped rotor having heat transfer surfaces thereon, a housing having a generally cylindrical cavity in which said drum shaped rotor having heat transfer surfaces thereon is mounted for rotation on a shaft, said heater including ducting for directing flue gas and forced draft air respectively into first and second angular sectors of the cavity which at any one instant will flow over respective angular sectors of said rotor;

said rotor being heated during the travel of any portion thereof in said first angular sector and being cooled in said second angular sector;

an elongated duct for conducting all of the forced draft air out of said heater;

first means for ducting, said first means for ducting directing only the forced draft air flowing over a portion of said rotor immedeately after passage of each portion thereof from said first angular sector into said second angular sector; and second means for ducting, said second means for ducting directing the forced draft air from said first means for ducting to said pulverizer.

2. The apparatus as described in claim 1 wherein:

said first means for ducting includes a partition in said duct to separate flow through said duct into major and minor parts.

3. The apparatus as described in claim 2 wherein:

said partition is generally aligned with the axis of said duct.

4. The apparatus as described in claim 3 wherein:

said partition is disposed in spaced relation with respect to a face of said preheater.

5. The apparatus as described in claim 4 wherein:

said second means for ducting comprises a generally Y-shaped duct having first and second legs, said first leg being coupled to said first means for ducting.

6. The apparatus as described in claim 5 wherein:

said second leg is coupled to said duct in a manner to receive only a part of the flow through said duct that is not a part of the flow through said first means for ducting.

7. The apparatus as described in claim 5 wherein:

said duct further includes a third means for ducting, said third means for ducting directing only the forced draft air flowing over a portion of said rotor just before passage of each portion thereof from said second angular sector into said first angular sector, said third means for ducting is coupled to said second leg.

8. The apparatus as described in claim 7 wherein:

said third means for ducting comprises a second partition.

9. The apparatus as described in claim 8 wherein:

said second partition is generally aligned with the axis of said duct.

10. The apparatus as described in claim 9 wherein:

said second partition is disposed in spaced relation with respect to a face of said heater.

11. A bisector regenerative heater for cooperation with an associated furnace apparatus, an associated pulverizer and associated ducting to direct the flow of pulverized coal to the associated windboxes; a plurality of associated water walls each including a plurality of tubes, the water walls collectively defining a combustion chamber, a plurality of windboxes, each being disposed intermediate adjacent water walls which comprises:

a bisector regenerative air heater having a drum shaped rotor having heat transfer surfaces thereon and a housing having a generally cylindrical cavity in which said drum shaped rotor is mounted for rotation on a shaft, said heater including ducting for directing flue gas and forced draft air respectively into first and second angular sectors of the cavity which at any one instant will flow over respective angular sectors of said rotor;

said rotor being heated during the travel of any portion thereof in said first angular sector and being cooled in said second angular sector;

an elongated duct for conducting all of the forced draft air out of said heater;

first means for ducting, said first means for ducting directing only the forced draft air flowing over a portion of said rotor immedeately after passage of each portion thereof from said first angular sector into said second angular sector; and second means for ducting, said second means for ducting directing the forced draft air from said first means for ducting to said pulverizer.

12. The apparatus as described in claim 11 wherein:

said first means for ducting includes a partition in said duct to separate flow through said duct into major and minor parts.

13. The apparatus as described in claim 12 wherein:

said partition is generally aligned with the axis of said duct.

14. The apparatus as described in claim 13 wherein:

said partition is disposed in spaced relation with respect to a face of said preheater.

15. The apparatus as described in claim 14 wherein:

said second means for ducting comprises a generally Y-shaped duct having first and second legs, said first leg being coupled to said first means for ducting.

16. The apparatus as described in claim 15 wherein: said second leg is coupled to said duct in a manner to receive only a part of the flow through said duct that is not a part of the flow through said first means for ducting.

17. The apparatus as described in claim 15 wherein:

said duct further includes a third means for ducting, said third means for ducting directing only the forced draft air flowing over a portion of said rotor just before passage of each portion thereof from said second angular sector into said first angular sector, said third means for ducting is coupled to said second leg.

18. The apparatus as described in claim 17 wherein:

said third means for ducting comprises a second partition.

19. The apparatus as described in claim 18 wherein:

said second partition is generally aligned with the axis of said duct.

20. The apparatus as described in claim 19 wherein:

said second partition is disposed in spaced relation with respect to a face of said heater.

\* \* \* \* \*